United States Patent Office 3,486,596
Patented Dec. 30, 1969

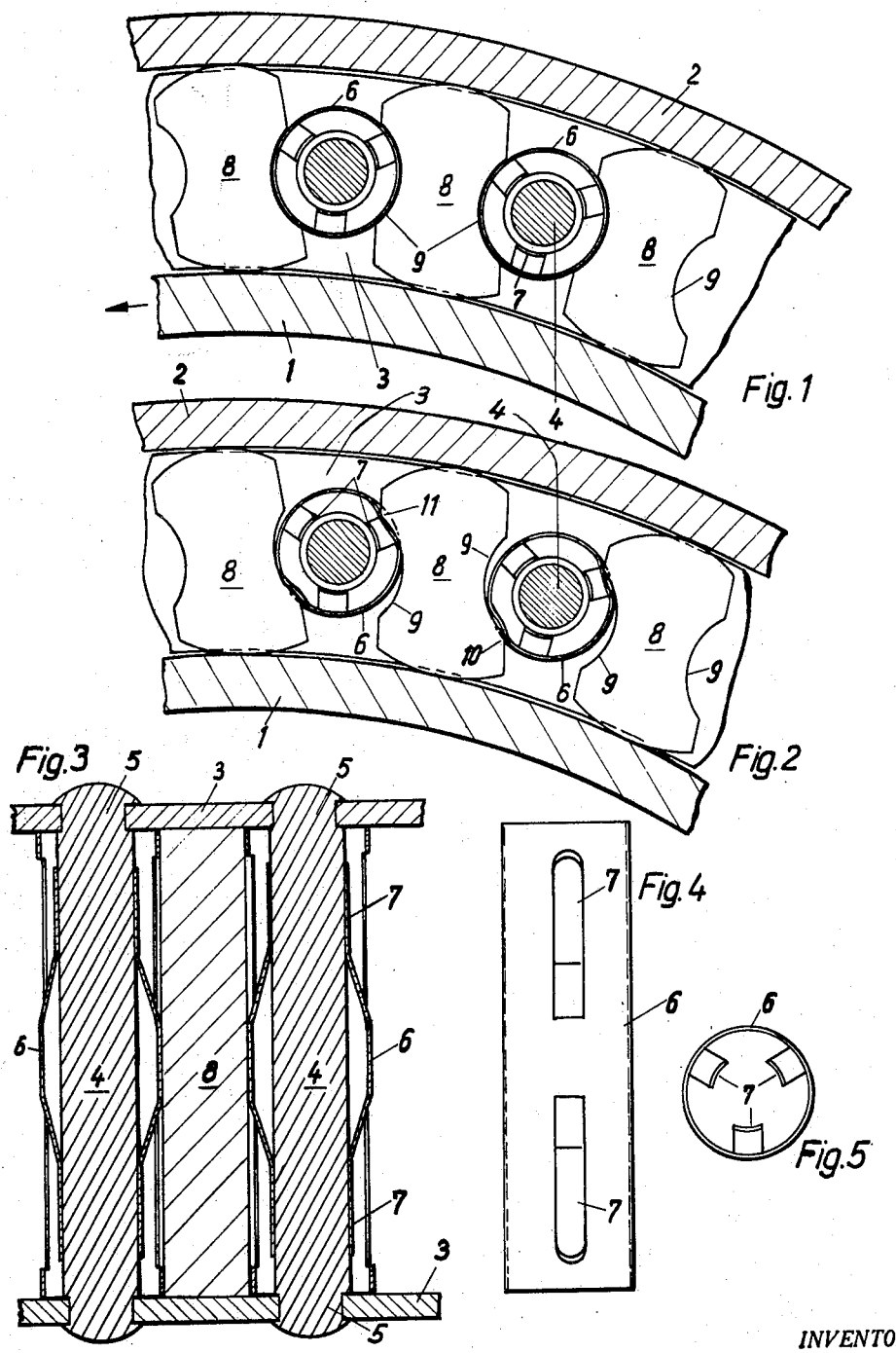

3,486,596
ONE-WAY CLUTCH WITH RESILIENT BUSHING
Peter Bass and Karl Bass, both of Industriestrasse 4,
Rothenburg ob der Tauber, Germany
Filed May 8, 1967, Ser. No. 636,712
Claims priority, application Great Britain, Feb. 23, 1967,
8,701/67; Germany, May 31, 1966, B 87,364
Int. Cl. F16d 15/00, 41/06
U.S. Cl. 192—45.1                                    7 Claims

ABSTRACT OF THE DISCLOSURE

For rotatively coupling two rotary members only for one direction of relative rotation between them, a clutch assembly composed of a plurality of pivotal clamping elements and bushings associated with the clamping elements and capable of being deformed by the pivotal movements of the clamping elements so as to apply a biasing force urging the clamping elements toward the position in which they couple the two rotary members together, the bushings being shiftable in a direction around the circumference of the clutch assembly for permitting the load forces on the clamping elements to be uniformly distributed among them.

BACKGROUND OF THE INVENTION

The invention relates to a free-wheel, or one-way, coupling with an outer and an inner coupling member, pivotable clamping elements rounded off at both their sides, and a cage serving to receive and secure the pivotable clamping elements such that the latter are subject to a biasing pressure in the direction of rotation in which the coupling members are to be coupled in driving relationship.

German patent specification 1,142,254 teaches a free-wheel coupling in which the pivotable clamping elements, or shoes, are clamped into an annular metal strip and are biased by resilient tongues provided on the latter. In this known form of construction the strip metal cage is, for constructional reasons, made considerably wider than the pivotable clamping elements. As the pivotable clamping elements, in operation, only execute extremely small pivotal movements, the tongues of the metal strip are only moved a small distance so that the accompanying restoring force is very small.

In particular, when, after a long period of operation, the coupling surfaces of individual pivotable clamping elements have become worn, the clamping elements involved are no longer urged in the direction for coupling the rings, so that when the latter are coupled together impact shocks occur. Also, it is hardly possible to so manufacture the strip of metal, which is made of a high quality resilient material, that it will exert a constant resilient pressure on all of the pivotable clamping elements even after a long period of use. Since the different clamping elements of this known type of free-wheel coupling are subjected to varying degrees of pressure for biasing them in the direction for coupling the coupling members together, they experience differing degrees of wear. Further, when the coupling occurs, load forces of differing magnitudes are applied to the pivotable clamping elements; this leads to correspondingly different degrees of wear of the clamping elements, as well as to impact shocks. The short resilient tongues readily show ageing phenomena and are subjected to heavy wear. Consequently the useful life of this form of coupling is limited.

German published application 1,200,616 discloses a cage-less free-wheel, or one-way coupling in which specially bent spring elements are inserted between adjacently positioned clamping elements. In this form of construction, in the free-wheel, or free-running, condition, the pressure in the direction of mutual coupling of the coupling members is the difference between two oppositely directed force moments. It is readily clear that, in consequence of the manufacturing tolerances of the resilient elements, the resulting pressure moment varies to a large degree from clamping element to clamping element, so that the drawbacks referred to above are also present in this form of construction.

SUMMARY OF THE INVENTION

It is therefore a primary object of the present invention to eliminate the above-noted drawbacks and difficulties.

A more specific object of the present invention is to provide such a coupling in which dimensional inaccuracies are automatically compensated.

A further object of the present invention is to provide such a coupling in which the load forces on the coupling elements are uniformly distributed among them.

Yet another object of the present invention is to provide a coupling in which compensation is automatically made for the wear experienced by the clamping element bearing surfaces.

The present invention involves improvements in a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between, and connecting, the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled. The above-noted objects, and other objects according to the present invention are achieved by the improvement composed of a plurality of resilient bushings disposed between the plates and each mounted on a respective connecting pin, the bushings cooperating with the clamping elements, when the latter are in their second position, for urging the elements towards their first position, the bushings being moveable with respect to their associated pins in a direction perpendicular to the axes of their associated pins for compensating dimensional inaccuracies in the assembly and for placing the elements in force-transmitting communication with one another so as to produce a uniform distribution among the elements of the load forces applied thereto by the rotary members. Each clamping element is disposed between an adjacent pair of bushings and has opposite lateral wall portions each of which is adjacent the respective bushing. Each wall portion is provided with a recess having a cross section complementary to that of the associated bushing.

BRIEF DESCRIPTION OF THE DRAWINGS

FIGURE 1 is an axial cross-sectional view of a free-wheel coupling according to the present invention in the engaged or coupled condition.

FIGURE 2 is a partial view showing the free-wheel condition of the coupling.

FIGURE 3 is a partial longitudinal, cross-sectional taken through the cage.

FIGURE 4 is an elevational view of a bushing of the arrangement shown in FIGURES 1–3.

FIGURE 5 is a cross-sectional view of the bushing of FIGURE 4.

DESCRIPTION OF THE PREFERRED EMBODIMENTS

Figure 6:
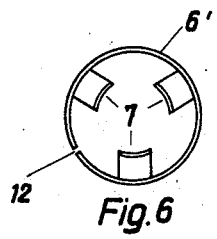
FIGURE 6 is a cross-sectional view of a modified form of the bushing.

In FIGURES 1 and 2 can be seen an inner cylindrical coupling member 1 and an outer cylindrical coupling member 2, between which is interposed the coupling cage, or one-way clutch assembly, defined by two annular side plates 3 lying perpendicular to the axis of the coupling and receiving between them the different structural parts. The cage may be made of steel or a similar metal or of plastic. In FIGURES 1 and 2 one of the side plates has been omitted so that the inner cage parts can be more clearly seen.

FIGURE 3 shows that between the plates 3 there are disposed pins 4 provided at their ends with narrowed neck portions 5 received by the plates 3 and conveniently riveted thereto. The pins 4 interconnect plates 3 and support resilient bushings 6 which are preferably of cylindrical shape and which include tongues, or tabs 7 which are cut out from the material of the bushings and then bent radially inwardly.

As illustrated in FIGURES 4 and 5, there are preferably provided two annular bands of tongues, with the tongues of each band forming a star pattern. The resilient tongues clamp the associated bushings 6 on the pins 4, and provide restoring forces for maintaining the bushings in centered position on the pins 4 and for urging the bushings to retain their cylindrical shape. Interposed between each adjacent pair of bushings 6 is a pivotable clamping, or coupling, element 8 which has opposite lateral wall portions adjacent the respective bushings, each wall portion being provided with a recess 9 whose transverse cross-sectional shape is complementary to that of the periphery of the bushings 6. This permits a more effective transmission of load forces to be achieved between the clamping elements and the bushings. Preferably the bushings 6 are of cylindrical peripheral contour, in which case the recesses 9 are shaped in a complementary manner as segments of a cylinder.

The manner of operation of one-way clutch, or coupling, is clear from FIGURES 1 and 2. FIGURE 1 illustrates the engaged or coupled condition of the coupling in which the inner coupling member 1, which rotates in the direction indicated by the arrow, transmits torque to the outer coupling member 2. In a manner known per se, the clamping elements 8 are wedged between the coupling members so that a frictional connection is established between those parts. As soon as the inner coupling member 1 begins to rotate slower than the outer coupling member 2, or as soon as the outer coupling member overtakes the inner coupling member, the pivotable clamping elements 8 are caused to pivot in counterclockwise direction, so as to assume the free-wheeling, or free-running condition illustrated in FIGURE 2. In this position, the edges 10 and 11 of recesses 9 bear resiliently against the bushings 6 so as to cause the latter to deform resiliently under the applied pressure. In FIGURE 2 the resilient compression of the bushings 6 has been somewhat exaggerated for greater clarity.

As a consequence of the elastic deformation of bushings 6, a restoring force is applied to the edges 10 and 11 in a direction for urging the elements 8 back into a position where they couple the members 1 and 2 together. A torque is thus transmitted to the clamping elements 8 which causes them to remain in contact with the coupling members 1 and 2 during the free-wheeling condition of the coupling. It has been found that this makes it possible to prevent undesirable and harmful impact shocks from occurring when the coupling, or clutch, is once again engaged.

When the members 1 and 2 are in the coupled, or engaged, position, the pivotable clamping elements 8 are securely held in the positions shown in FIGURE 1 by the pressure exerted by members 1 and 2 so that they exert substantially no pressure on the bushings 6. When the assembly is in the free-wheel position of FIGURE 2, the clamping elements 8 are only pivoted through a small angle so that the resilient bushings are elastically deformed. In this way a restoring force is applied to the clamping elements in the direction of engagement of the coupling, so that the clamping elements are in continuous contact with the coupling rings. Thus, in the free-wheeling position of the coupling, the pivotable clamping elements 8 make contact with the bushings along two longitudinal strips of the periphery of the latter, each bushing being in contact with each adjacent clamping element along a respective line. This arrangement provides for a favorable transmission of the thrust moments between the bushings and the clamping elements and ensures that a non-resilient, or permanent, deformation of the bushings will not occur.

It is further clear from FIGURES 1 and 2 that the cylindrical portions of the resilient bushings 6 are capable of moving substantially as a unit relative to their associated pins 4 so as to be positioned eccentrically with respect to the axes of pins 4. Such movement makes it possible to compensate for inaccuracies in the dimensions of the bushings and the clamping elements and for disparities in the load distribution around the periphery of the coupling assembly. In this way an automatic adjustment will continuously take place when, during a long period of use, some of the engagement surface of the clamping elements 8 become altered by wear. This ability of the bushings to move off center as a unit mainly serves to center the pivotable clamping elements, whereas the above-mentioned resilient deformation of the bushings serves to bias the clamping elements individually in a direction for coupling together the coupling members 1 and 2.

Figure 7:
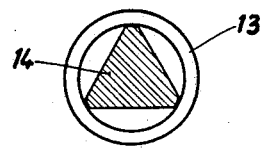
FIGURE 7 is a cross-sectional view of another form of bushing with its associated pin.
Figure 8:
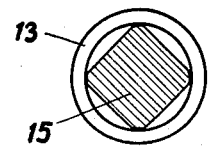
FIGURE 8 is a similar view to that of FIGURE 7 for another embodiment of the present invention.

The bushings 6 may consist of sections of tube as shown in FIGURE 5, the tongues or tabs 7 being cut out of the bushings and then bent over. Alternatively, as shown in FIGURE 6, a bushing 6' may be rolled into cylindrical shape from a flat metal strip. The gap 12 remaining is not disadvantageous in any way. The tongues 7 are formed in the manner described above. The bushings 6 or 6' and the recesses 9 need not necessarily have a cylindrical cross section. Moreover, instead of resilient tongues 7 it is possible to use other kinds of resilient elements, e.g., resilient rubber pads or buffers, elastic inlays, etc. When the bushings are moved as a unit with respect to their pins 4, tongues 7, because of their resiliency, continue to clamp the bushings on the pins. Referring now to FIGURES 7 and 8, the bushings may also consist of cylindrical casings 13 made of elastic rubber material or of a suitable synthetic plastic material. In this case the pins of the cage will preferably have a polygonal cross-sectional shape, the pin 14 of FIGURE 7 having a triangular cross section and the pin 15 of FIGURE 8 having a rectangular cross section. When these forms of construction are used, the pins will be in contact with longitudinal strips of the inner periphery of the bushings at spaced points about the periphery of the pins. The manner of operation and purpose of these bushings 13 is the same as the above-described bushings 6.

It will be understood that the above description of the present invention is susceptible to various modifications, changes, and adaptations, and the same are intended to be comprehended within the meaning and range of equivalents of the appended claims.

We claim:

1. In a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between and connecting the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled, the improvement comprising a plurality of resilient normally substantially cylindrical bushings disposed between the plates and each mounted on a respective connecting pin, said bushings cooperating with said clamping elements, when the latter are in their said second position, for urging said elements toward their said first position, said bushings being movable with respect to their associated pins in a direction perpendicular to the axes of their associated pins for compensating dimensional inaccuracies in the assembly and for placing said elements in force-transmitting communication with one another so as to produce a uniform distribution among said elements of the load forces applied thereto by the rotary members, each of said clamping elements being disposed between an adjacent pair of said bushings and having opposite lateral wall portions which are adjacent the respective bushings, each wall portion being provided with a concave recess having a cross section complementary to that of the associated bushing.

2. An arrangement as defined in claim 1 wherein said recesses have the form of cylindrical segments.

3. In a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between and connecting the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled, the improvement comprising a plurality of resilient bushings disposed between the plates and each mounted on a respective connecting pin, said bushings cooperating with said clamping elements, when the latter are in their said second position, for urging said elements toward their said first position, said bushings being movable with respect to their associated pins in a direction perpendicular to the axes of their associated pins for compensating dimensional inaccuracies in the assembly and for placing said elements in force-transmitting communication with one another so as to produce a uniform distribution among said elements of the load forces applied thereto by the rotary members, each of said clamping elements being disposed between an adjacent pair of said bushings and having opposite lateral wall portions which are adjacent the respective bushings, each wall portion being provided with a recess having a cross section complementary to that of the associated bushing, said assembly further comprising a resilient support disposed between each said bushing and its associated pin for supporting said bushing on its pin.

4. An arrangement as defined in claim 3 wherein each said support is composed of a plurality of tongues integral with their associated bushing, said tongues being bent inwardly from said bushing and bearing resiliently against the associated pin at spaced points around the periphery of said bushing.

5. An arrangement as defined in claim 4 wherein each said bushing is constituted by a drawn cylindrical tube.

6. An arrangement as defined in claim 4 wherein each said bushing is in the form of a rolled cylindrical tube.

7. In a one-way clutch assembly for rotatively coupling an outer rotary member to an inner rotary member for one direction of relative rotation between the members and for decoupling the members from one another for the opposite direction of relative rotation between them, which assembly includes annular side plates disposed between the inner and outer members, connecting pins extending between and connecting the plates, and a plurality of pivotable clamping elements interposed between the members, retained between the plates, and provided with rounded side portions by which they contact the members, the clamping elements being pivotable, under the influence of the relative rotation between the members, between a first position in which they couple the members rotatively together and a second position in which the members are operatively decoupled, the improvement comprising a plurality of resilient bushings disposed between the plates and each mounted on a respective connecting pin, said bushings cooperating with said clamping elements, when the latter are in their said second position, for urging said elements toward their said first position, said bushings being movable with respect to their associated pins in a direction perpendicular to the axes of their associated pins for compensating dimensional inaccuracies in the assembly and for placing said elements in force-transmitting communication with one another so as to produce a uniform distribution among said elements of the load forces applied thereto by the rotary members, each of said clamping elements being disposed between an adjacent pair of said bushings and having opposite lateral wall portions which are adjacent the respective bushings, each wall portion being provided with a recess having a cross section complementary to that of the associated bushing, each of said bushings being constituted by a resilient elastic tube and each of said pins having a polygonal cross section and contacting its associated bushing along linear surfaces thereof extending parallel to the axis of said pin and disposed around the periphery of said bushing.

References Cited

UNITED STATES PATENTS

| | | | |
|---|---|---|---|
| 2,364,280 | 12/1944 | Dodge | 192—45.1 |
| 2,365,062 | 12/1944 | Dodge | 192—45.1 |
| 2,555,484 | 6/1951 | Gruenberg et al. | 192—45.1 |
| 2,599,793 | 6/1952 | Warner | 192—45.1 |
| 2,614,670 | 10/1952 | Heintz | 192—45.1 |
| 2,822,905 | 2/1958 | Dodge | 192—45.1 |

MARTIN P. SCHWADRON, Primary Examiner

L. J. PAYNE, Assistant Examiner

U.S. Cl. X.R.

192—43.1, 43.2